(12) United States Patent
Ren et al.

(10) Patent No.: US 9,203,590 B2
(45) Date of Patent: Dec. 1, 2015

(54) GENERALIZED OUTER LOOP LINK ADAPTATION

(71) Applicant: Telefonaktiebolaget L M Ericsson, Stockholm (SE)

(72) Inventors: Hong Ren, Kanata (CA); Xixian Chen, Ottawa (CA); Peter Hazy, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 70 days.

(21) Appl. No.: 14/071,829

(22) Filed: Nov. 5, 2013

(65) Prior Publication Data
US 2015/0124709 A1    May 7, 2015

(51) Int. Cl.
*H04L 12/28* (2006.01)
*H04W 4/00* (2009.01)
(Continued)

(52) U.S. Cl.
CPC .............. *H04L 5/006* (2013.01); *H04L 1/0015* (2013.01); *H04L 1/20* (2013.01); *H04W 24/02* (2013.01); *H04L 1/0003* (2013.01); *H04L 1/0009* (2013.01)

(58) Field of Classification Search
CPC ... H04L 1/0002; H04L 1/0003; H04L 1/0009; H04L 1/003; H04L 1/0026; H04L 1/20; H04L 1/203; H04L 1/1822; H04L 5/006; H04L 5/0007; H04L 25/024; H04L 27/0008; H04L 27/2601; H04L 1/0001; H04L 1/0015; H04L 1/0023; H04L 5/0057; H04L 25/03949; H04L 2025/03426; H04J 11/005; H04B 7/022; H04B 7/0408; H04B 7/0413; H04B 7/0417; H04B 7/0452; H04B 7/0619; H04B 7/0626; H04B 7/0632; H04B 7/0669; H04B 7/068; H04B 7/0689; H04B 7/2643; H04B 1/10; H04B 7/024; H04B 7/0456; H04B 7/0634; H04B 17/309; H04W 24/00; H04W 24/02; H04W 24/08; H04W 24/10; H04W 28/0236; H04W 72/0413; H04W 72/082; H04W 72/085; H04W 72/1231; H04W 52/241; H04W 52/245
USPC .................. 370/204, 235–238, 252, 254–255, 370/329–338, 431, 437, 464–465
See application file for complete search history.

(56) References Cited

U.S. PATENT DOCUMENTS 7,664,047 B2   2/2010   Hamalainen
7,933,606 B2   4/2011   Frederiksen et al.
(Continued)

FOREIGN PATENT DOCUMENTS

EP   1986365 A1   10/2008
WO   2009100775 A1   8/2009

OTHER PUBLICATIONS

Aho, K. et al. "CQI Reporting Imperfections and their Consequences in LTE Networks." ICN 2011: The Tenth International Conference on Networks, Jan. 23-Jan. 28, 2011, pp. 241-245.

*Primary Examiner* — Tri H Phan
(74) *Attorney, Agent, or Firm* — Coats & Bennett, P.L.L.C.

(57) ABSTRACT

Methods and apparatus are disclosed for a generalized outer loop link adaptation procedure. A normal outer-loop control procedure corrects an estimated SINR, which may be inaccurate if the estimate SINR is mapped from a channel quality estimate that does not reflect the true radio link condition. A normal outer control procedure functions properly only when a normal Modulation and Coding Scheme (MCS) is selected. A normal MCS is the highest Modulation and Coding Scheme (MCS) with which the target Block Error Rate (BLER) can be achieved given a certain number of HARQ (Hybrid Automatic Repeat Request) transmissions. The present application discloses a generalized outer loop link adaptation procedure that functions properly whether the selected MCS is normal, aggressive, or conservative.

20 Claims, 9 Drawing Sheets

(51) Int. Cl.
  *H04L 5/00* (2006.01)
  *H04W 24/02* (2009.01)
  *H04L 1/20* (2006.01)
  *H04L 1/00* (2006.01)

(56) References Cited

U.S. PATENT DOCUMENTS

| | | | |
|---|---|---|---|
| 8,687,527 B2* | 4/2014 | Jiang et al. | 370/278 |
| 8,750,358 B2* | 6/2014 | Yue et al. | 375/227 |
| 8,798,550 B2* | 8/2014 | Hammarwall et al. | 455/67.13 |
| 8,953,475 B2* | 2/2015 | Li et al. | 370/252 |
| 8,995,282 B2* | 3/2015 | Lundevall et al. | 370/241 |
| 2010/0284454 A1 | 11/2010 | Oteri et al. | |
| 2011/0032839 A1 | 2/2011 | Chen et al. | |
| 2012/0276896 A1 | 11/2012 | Ren et al. | |
| 2012/0294228 A1* | 11/2012 | Song et al. | 370/315 |
| 2013/0028307 A1 | 1/2013 | Ren et al. | |
| 2013/0042157 A1 | 2/2013 | Mohammadi et al. | |
| 2013/0182569 A1* | 7/2013 | Bertrand et al. | 370/232 |
| 2013/0301432 A1* | 11/2013 | Hammarwall et al. | 370/252 |
| 2013/0310091 A1* | 11/2013 | Tabet et al. | 455/501 |
| 2014/0126467 A1* | 5/2014 | Lu et al. | 370/328 |
| 2014/0307645 A1* | 10/2014 | Ji et al. | 370/329 |
| 2015/0049703 A1* | 2/2015 | Nobukiyo et al. | 370/329 |

* cited by examiner

GENERALIZED OUTER LOOP LINK ADAPTATION

TECHNICAL FIELD

The present invention relates generally to link adaptation and, more specifically, to an improved outer-loop link adaptation process.

BACKGROUND

Link Adaptation (LA) is an important function in wireless communications systems. In LTE, the purpose of LA is to determine a modulation and coding scheme (MCS) that will maximize the transmitter's data rate under a given radio link condition. In a typical system that implements a retransmission scheme, e.g., a Hybrid Automatic Repeat Request (HARQ) scheme, the LA process is designed to select the highest MCS with which a target Block Error Rate (BLER) can be achieved after a number of transmissions. In the present disclosure, a transmission success or failure refers to the success or failure after a given number of HARQ transmissions. Typically, an MCS is selected for each transport block, which is transmitted every transmission time interval (TTI). The LA process selects an appropriate MCS based on the current radio link quality that is either measured by the transmitter or reported by the receiver in the format of channel state information (CSI).

For a LA process to work properly, the reported CSI should reflect the true channel condition. The CSI should also be consistently reported by the receivers, e.g., user equipments (UEs). However, the methodology of link quality evaluation has not been standardized and varies from vendor to vendor. Some UEs may report CSI that, after being interpreted by the eNB, represents a channel condition better than the true channel condition, i.e., optimistic CSI. Some UEs may report pessimistic CSI that represents a channel condition worse than the true channel condition. The eNB converts the received CSI into channel quality measurements, for example, Signal to Interference plus Noise Ratio (SINR) estimates. Inaccurate CSI reports lead to inaccurate SINR estimates.

An outer-loop control process has been introduced to correct SINR estimates. However, the outer-loop control process works only when the selected MCS is "normal." A selected MCS is normal if the selected MCS is the highest MCS with which the target BLER can be achieved under the current channel condition. When the MCS is intentionally selected to be higher or lower than the normal MCS, the normal outer-loop control process would most likely fail to yield a converging or reliable SINR value.

The present application discloses methods and apparatus for improving the normal outer-loop control process to ensure that the outer-loop control process works properly no matter whether the selected MCS is normal, conservative, or aggressive.

SUMMARY

The present invention provides methods and apparatus for improving an outer-loop link adaptation (LA) process.

In some embodiments, a method of adjusting an estimated signal to interference plus noise ratio (SINR) in an outer-loop link adaptation (LA) process comprises the following steps. First, receive a channel state information report from a user equipment. Second, estimate an SINR value based on the CSI report and an outer-loop adjustment. Third, select a modulation and coding scheme (MCS) for transmission of a data packet based on the estimated SINR and a target error rate. The selected MCS may be normal, conservative or aggressive. Fourth, monitor the outcome of the transmission. If the transmission has failed and the selected MCS is normal or conservative, reduce the outer-loop adjustment by a downward step. If the transmission has failed and the selected MCS is aggressive, selectively reducing the outer-loop adjustment by a downward step in dependence on an accumulated aggressive adjustment. If the transmission is successful and the selected MCS is normal or aggressive, increase the outer-loop adjustment by an upward step. If the transmission is successful and the selected MCS is conservative, selectively increasing the outer-loop adjustment by an upward step in dependence on an accumulated conservative adjustment.

In some embodiments, a wireless device is configured to adjust an estimated signal to interference plus noise ratio (SINR) in an outer-loop link adaption process. The wireless device includes a transceiver and one or more processors. The processors further comprise an outer-loop link adaptation circuit and a memory. The outer-loop link adaptation circuit is configured to receive a CSI report from a user equipment, estimate an SINR value based on the CSI report and an outer-loop adjustment, select a modulation and coding scheme (MCS) for transmission of a data packet based on the estimated SINR value, and monitor the outcome of the transmission. Depending on whether the transmission has failed or is successful, the processor is configured to adjust the outer-loop adjustment differently. If the transmission has failed and the selected MCS is normal or conservative, the processor is configured to reduce the outer-loop adjustment by a downward step. If the transmission has failed and the selected MCS is aggressive, the processor is configured to selectively reduce the outer-loop adjustment by the downward step in dependence on an accumulated aggressive adjustment. If the transmission is successful and the selected MCS is normal or aggressive, the processor is configured to increase the outer-loop adjustment by the upward step. If the transmission is successful and the selected MCS is conservative, the processor is configured to selectively increase the outer-loop adjustment by an upward step in dependence on an accumulated conservative adjustment.

Of course, the present invention is not limited to the features, advantages, and contexts summarized above, and those familiar with wireless telecommunications technology will recognize additional features and advantages upon reading the following detailed description and upon viewing the accompanying drawings.

DETAILED DESCRIPTION

Figure 1:
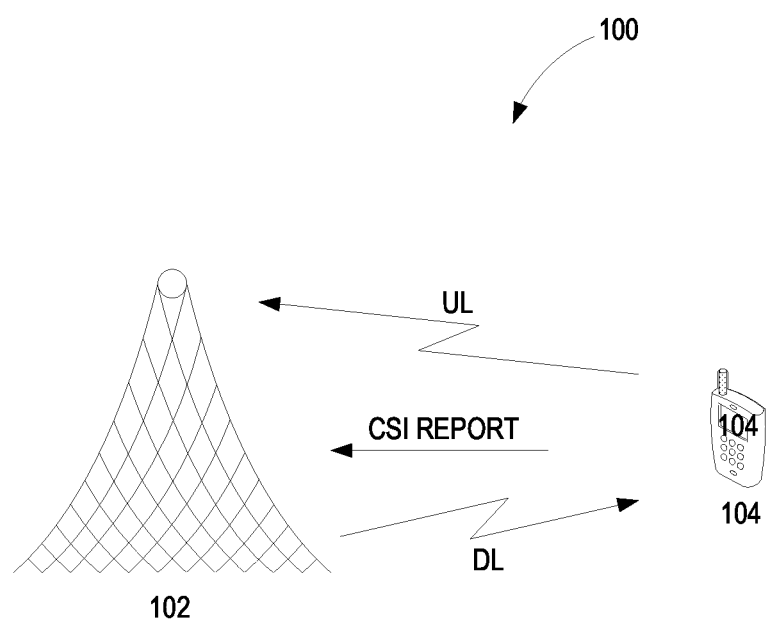
FIG. 1 illustrates an exemplary wireless communications network.

FIG. 1 illustrates an exemplary wireless communications network 100. In FIG. 1, an eNB 102 connects a UE 104 to the core mobile network (not shown) via radio interface. The eNB 102 transmits data to the UE 104 using the downlink radio connection (DL). The UE 104 transmits data to the eNB 102 using the uplink radio connection (UL). The UE 104 also reports radio link quality to the eNB 102 to allow the eNB 102 to adapt its downlink transmissions to the current radio link condition. In LTE, a link adaptation (LA) process implemented at the eNB 102 dynamically adjusts the downlink data rate to compensate for the varying channel conditions. In practice, the data rate is controlled by both the modulation scheme and channel coding rate. The purpose of a LA process therefore is to select a suitable modulation and coding scheme (MCS) based on the radio link quality. Normally, a LA process selects the highest MCS that can be used to achieve the target block error rate (BLER) given a certain number of HARQ transmissions under the current radio condition. The selection is based on the current channel condition as reported by the UE 104. If the channel quality reported by the UE 104 does not accurately reflect the true channel condition, when the eNB 102 transmits downlink data using the selected MCS, the actual BLER most likely will deviate from the target BLER.

Figure 2:
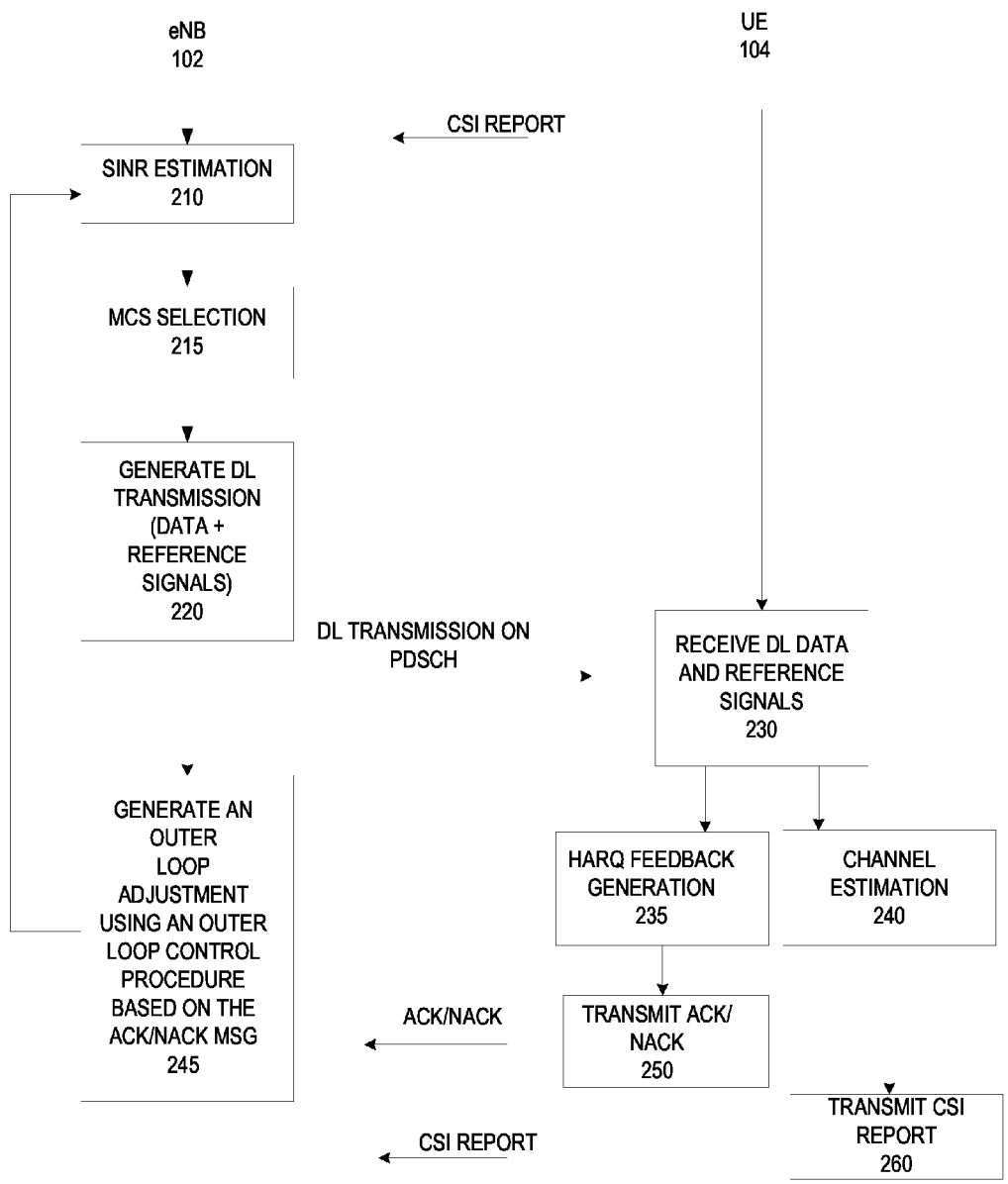
FIG. 2 illustrates an exemplary link adaptation process.

FIG. 2 is a flow chart illustrating an exemplary LA process implemented in the wireless communications system 100. In Step 210, the eNB 102 receives a channel state information (CSI) report from the UE 104, and based on the CSI report, the eNB 102 generates a channel quality measure (e.g., an estimated SINR). The estimated SINR may be adjusted by an outer-loop adjustment. The outer-loop adjustment may be initialized with a non-zero value reflecting the current system configuration and channel condition. Based on the corrected SINR, the eNB 102 selects an MCS for downlink data transmission (Step 215). The selected MCS is used by the eNB 102 to generate downlink (DL) data transmissions (step 220). In some embodiments, the DL data may be transmitted on a Physical Downlink Shared Channel (PDSCH). In some embodiments, UE-specific reference signals are transmitted within the resource blocks assigned to that specific UE for the downlink shared channel transmission. As such, a PDSCH may include DL data intended for the UE 104 and UE-specific reference signals, e.g., demodulation reference signals, which are intended to be used for channel estimation by the UE 104.

Figure 3:
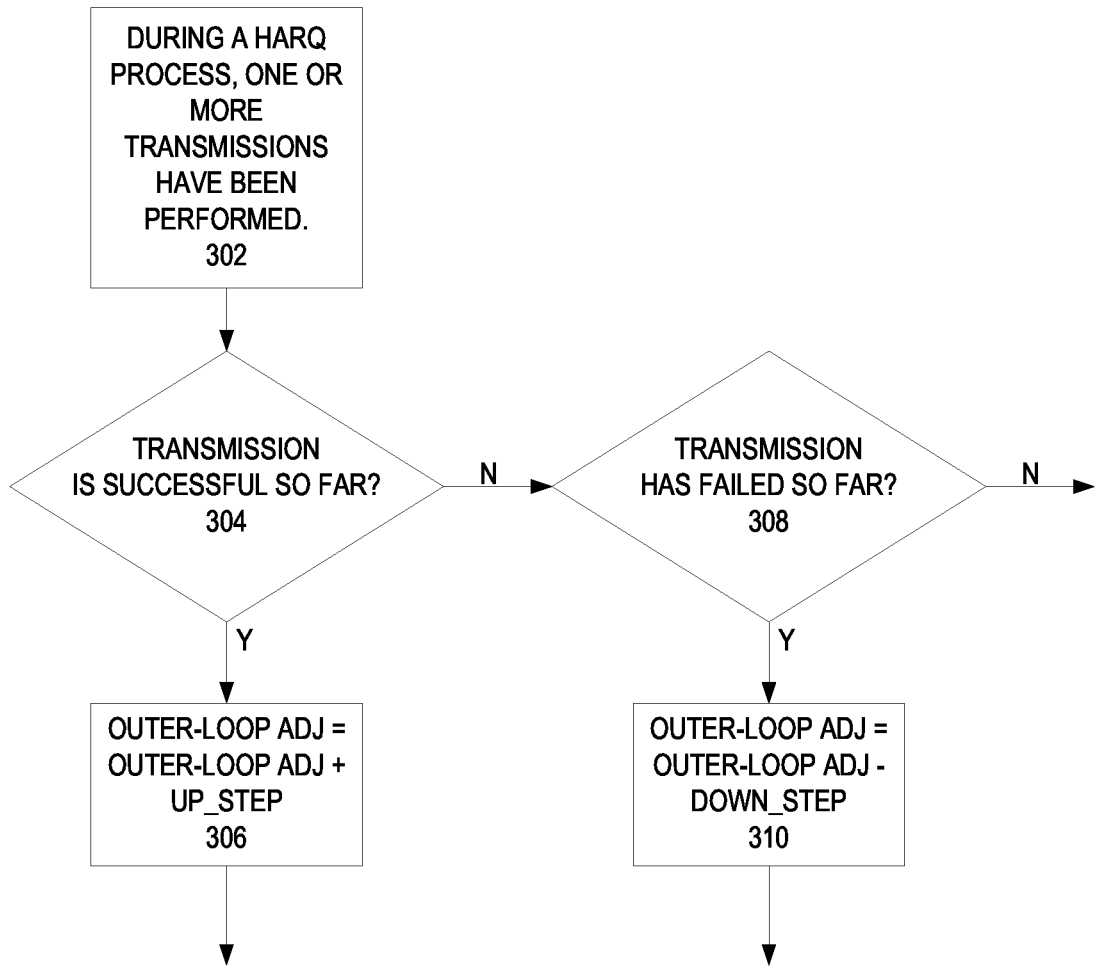
FIG. 3 illustrates an exemplary normal outer-loop control procedure.

In some embodiments, when the PDSCH transmission is received by the UE 104, the downlink transmissions include both data and reference signals (step 230). The UE 104 generates a HARQ feedback based on the received data (step 235) and uses the received reference signals for channel estimation (step 240). The UE 104 transmits the HARQ feedback (ACK or NACK message) to the eNB 102 (step 250). The UE 104 also transmits the channel estimate (i.e., CSI report) to the eNB 102, which is used by the eNB 102 for SINR estimation (see step 210). The ACK/NACK message is used by the eNB 102 to generate an outer loop adjustment using an outer loop control procedure (step 245). FIG. 3 illustrates an exemplary outer-loop control procedure.

In FIG. 3, at the eNB 102, the outer-loop control procedure begins when up to a certain number of HARQ transmissions have been performed (Step 302). An HARQ process terminates if an ACK message is received from the UE 104 or the maximum number of retransmissions is reached. In Step 304, the eNB 102 determines whether the transmission of the transport block is successful from the outer-loop control perspective. The transmission of the transport block is successful if the eNB 102 receives an ACK for the transmission when a certain number of transmissions (including re-transmissions) are reached. If the transmission is successful, the eNB 102 increases the outer-loop adjustment by an up_step (Step 306). If the transmission of the transport block is not successful, the eNB 102 determines whether the transmission of the transport block has failed (Step 308). The transmission is considered to have failed if the HARQ feedback received when a certain number of transmissions has reached is still a NACK. If the transmission has failed, the eNB reduces the outer-loop adjustment by a down_step (Step 310). It is possible that the transmission of the transport block is considered neither successful nor failed. Such scenario occurs when no ACK has been received when a certain number of transmissions are reached and no HARQ feedback signal is detected when a certain number of transmissions is reached.

The outer-loop control procedure shown in FIG. 3 is a so-called normal outer-loop control procedure. A normal outer-loop control procedure works properly to correct the estimated SINR when the CSI reported by the UE 104 is either optimistic or pessimistic. This is explained in the following example.

Suppose the target BLER is set to be 10% after one HARQ transmission. The sizes of the up_step and the down_step are set according to the target BLER. In some embodiments, the ratio of the up_step to the down_step may be set to 1:9, when the target BLER is 10%. When the target BLER (10%) is achieved, statistically speaking, 9 out of 10 transmissions will be successful and 1 out of 10 transmissions will fail after one HARQ transmission. Therefore, when the target BLER is achieved, 1 out of 10 first transmissions fails and the outer-loop adjustment is adjusted downward by the down_step 1 out of 10 times. Also when the target BLER is achieved, 9 out of 10 first transmissions succeed and the estimated BLER is adjusted upward by the up_step 9 out of 10 times.

In an ideal case, the reported CSI accurately reflects the actual channel condition and the estimated SINR is perfect. Because the selected MCS is the highest MCS with which the target BLER can be achieved, the target BLER is achieved with the selected MCS and the actual BLER is the same as the target BLER. Consequently, the upward adjustment applied to the outer-loop adjustment (9× the up_step) equals to the downward adjustment (1× the down_step).

In the case that the reported CSI is optimistic, the estimated SINR is above the actual SINR, reflecting a better channel condition than the actual channel condition. Because the MCS selected to transmit the transport block is based on the better channel condition inaccurately estimated, the selected modulation scheme and coding rate would yield an actual BLER higher than the target BLER. As a result, more than 1 out of 10 transmissions will fail. Consequently, compared to the ideal case, the upward adjustment applied to the estimated SINR will be smaller than the downward adjustment. As a result, overall adjustment applied to the estimated SINR is downward and the optimistic SINR is corrected.

In the case that the reported CSI is pessimistic, the actual BLER rate will be lower than the target BLER rate. More than 9 out of 10 transmissions (in other words, more than 90% transmissions) will succeed. As a result, the upward adjustment will be larger than the downward adjustment. The overall adjustment to the estimated SINR will be upward to correct the pessimistic SINR.

The above described normal outer-loop control procedure works properly only when the MCS is selected to be the highest MCS with which the target BLER can be achieved. In certain embodiments, the eNB 102 may select a conservative MCS that is lower than the highest MCS. This can occur when there is only a small amount of data in the user's buffer. Using the highest MCS supported by link quality would mean that more padding bits are transmitted, which wastes the precious radio resources without improving the user's throughput. Therefore, it is better to choose a conservative MCS as long as all user data can still be transmitted. Transmission with a conservative MCS is normally more reliable and reduces the number of re-transmissions. If a conservative MCS is used for transmission, the actual BLER is expected to be lower than the target BLER. In the normal outer-loop control procedure, when the actual BLER is lower than the target BLER, the overall adjustment to the estimated SINR is upward based on the assumption that the CSI is pessimistic, even though the estimated SINR may have matched the channel condition perfectly.

In certain embodiments, the eNB 102 may select an aggressive MCS that is higher than the highest MCS supported by the radio link. In such case, the actual BLER would be higher than the target BLER and the estimated SINR would be adjusted downward based on the assumption that the CSI is optimistic, even though the estimated SINR may have matched the channel condition perfectly.

Figure 4:
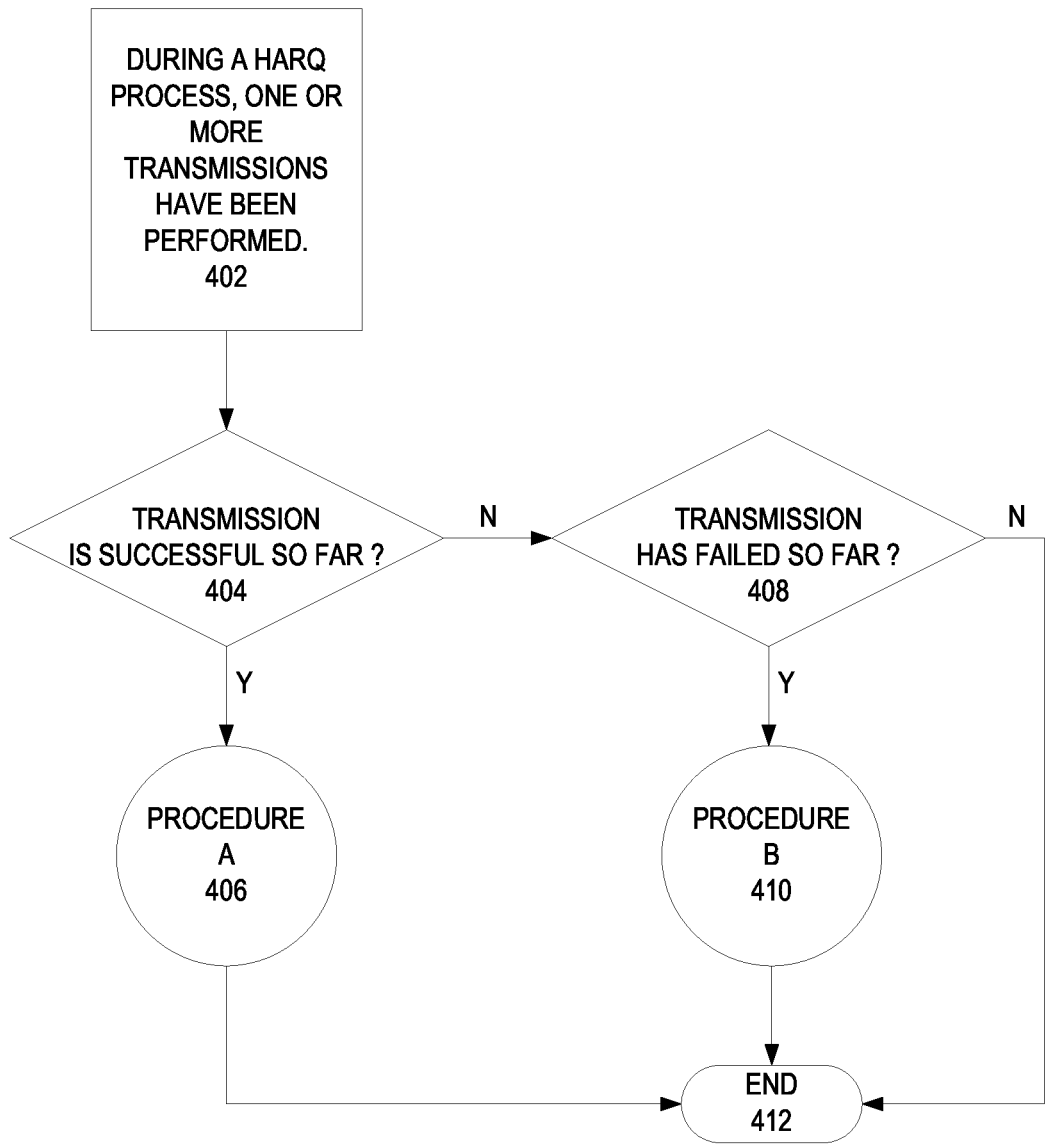
FIG. 4 illustrates another exemplary outer-loop control procedure.
Figure 5:
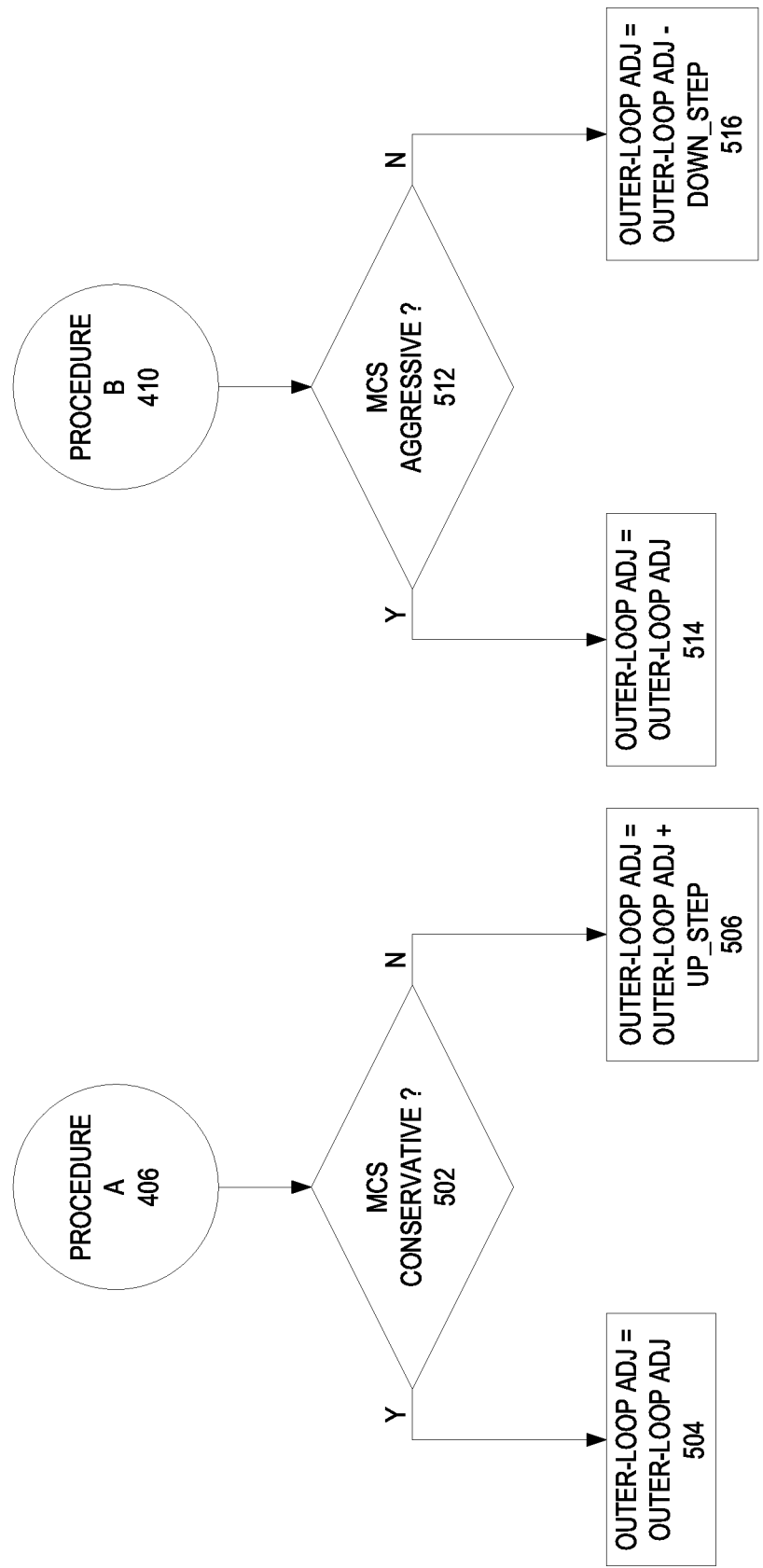
FIG. 5 illustrates a flow chart of two procedures used in an outer-loop control procedure.

The normal outer-loop control procedure does not work properly when the selected MCS is either conservative or aggressive. FIGS. 4 and 5 illustrate an embodiment of an improved outer-loop control procedure.

In FIG. 4, after a certain number of HARQ transmissions associated with the transmission of a transport block (Step 402), the eNB 102 determines whether the transmission is successful (Step 404). If it is successful, the eNB 102 invokes procedure A (Step 406). FIG. 5 describes the steps involved in procedure A. In procedure A, the eNB 102 decides whether the selected MCS is conservative (Step 502). If yes, the outer-loop adjustment is not adjusted (Step 504). If no, the outer-loop adjustment is adjusted upward by an up_step.

When the eNB 102 determines that the transmission has failed (Step 408), it invokes procedure B (Step 410). FIG. 5 describes the steps involved in procedure B. In procedure B, the eNB 102 decides whether the selected MCS is aggressive (Step 512). If yes, the outer-loop adjustment is not adjusted (Step 514). If no, the outer-loop adjustment is adjusted downward by a down_step (Step 516). After the procedure A or B ends, the outer-loop adjustment for this HARQ process is finished (Step 412).

Unlike the normal outer-loop control procedure described above, the outer-loop control procedure described in FIGS. 4 and 5 reacts to transmission failures only when the selected MCS is not aggressive. The outer-loop control procedure reacts to transmission successes only when the selected MCS is not conservative.

Similar to the normal outer-loop control procedure, the outer-loop control procedure described in FIGS. 4 and 5 does not work properly under certain scenarios. For example, in procedure A shown in FIG. 5, the outer-loop adjustment is adjusted upwards when the transmission is successful and the MCS is not conservative. When the selected MCS is aggressive, the actual BLER is expected to be larger than the target BLER. But some transmissions will still be successful. Although it happens infrequently, the infrequent upward adjustment to the outer-loop adjustment does not accurately reflect changes in the real channel condition. Because the outer-loop adjustment is accumulated, over a period of time, the infrequent wrong adjustments can introduce large error in the estimated SINR. In procedure B shown in FIG. 5, the outer-loop adjustment is adjusted downwards when the transmission has failed and the MCS is not aggressive. When the selected MCS is conservative, the actual BLER is expected to be lower than the target BLER. But some transmissions will still fail. Again although this happens infrequently, the adjustment to the outer-loop adjustment does not reflect changes in the real channel condition. Similarly, the infrequent wrong adjustments can introduce large error in the estimated SINR.

To remedy the above-described problems, a generalized outer-loop control procedure is proposed. This generalized outer-loop control procedure works as a normal outer-loop control procedure when the selected MCS is normal. It also correctly adjusts the outer-loop adjustment when conservative or aggressive MCS's are used.

When the selected MCS is conservative, the generalized outer-loop control procedure adjusts the outer-loop adjustment downward by a down_step whenever the transmission has failed. The control procedure tallies the downward adjustments that the outer-loop adjustment has accumulated using a separate parameter, which is referred as accumulated conservative adjustment and denoted as conservative_adj. When the transmission is successful and conservative_adj is less than a threshold, the outer-loop adjustment and conservative_adj are adjusted upward by an up_step. If conservative_adj is equal to or greater than the threshold, the generalized outer-loop does not respond to transmission successes. This process ensures that the total adjustments made by the generalized outer-loop control procedure converge to zero when the selected MCS is conservative, because the actual BLER is better than the target BLER and there are enough successes to cancel the accumulated downward adjustment.

When the selected MCS is aggressive, the generalized outer-loop control procedure adjusts the outer-loop adjustment upwards by an up_step whenever the transmission has succeeded. The control procedure also tallies the upward adjustments that the outer-loop adjustment has accumulated through a separate parameter, which is referred as accumulated aggressive adjustment and denoted as aggressive_adj. When the transmission has failed and aggressive_adj is greater than a threshold, the outer-loop adjustment and aggressive_adj are adjusted downward by a down_step. If aggressive_adj is equal to or less than the threshold, the generalized outer-loop control procedure does not response to transmission failures. This process ensures that the total adjustments made by the generalized outer-loop control procedure converge to zero when the selected MCS is aggressive, because the actual BLER is higher than the target BLER and there are enough transmission failures to cancel the accumulated upward adjustment.

Figure 6:
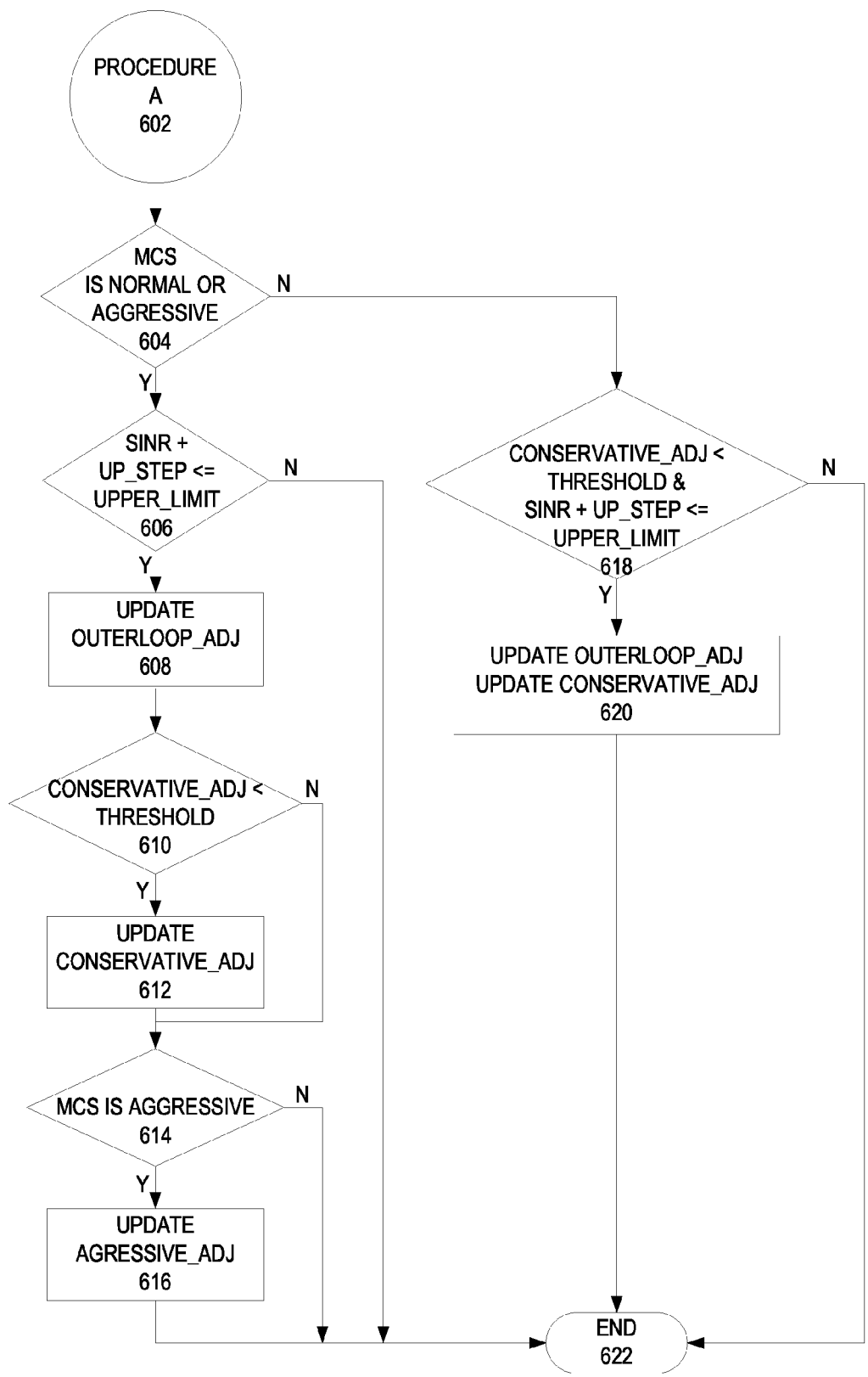
FIG. 6 illustrates a flow chart of a first improved procedure used in an outer-loop control procedure.
Figure 7:
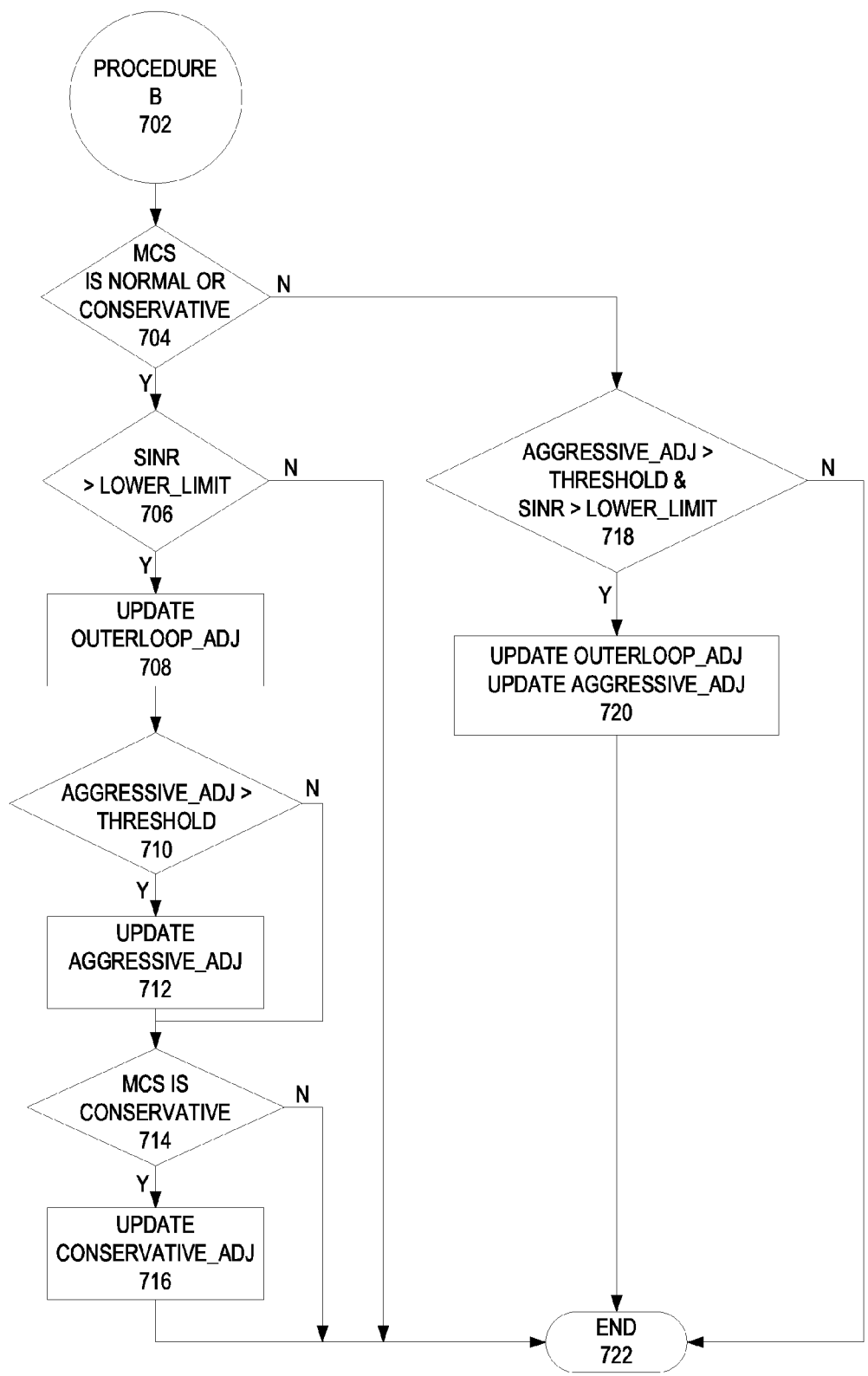
FIG. 7 illustrates a flow chart of a second improved procedure used in an outer-loop control procedure.

FIGS. 6 and 7 are flow charts illustrating an exemplary procedure A and an exemplary procedure B used in a generalized outer-loop control procedure.

In FIG. 6, procedure A 602 is invoked when the transmission of a transport block is successful. The generalized outer-loop control procedure determines whether the selected MCS is normal or aggressive (Step 604). If the selected MCS is normal or aggressive, the control procedure determines whether adjusting the outer-loop adjustment would exceed an upper limit set for the SINR (Step 606). If the upper limit would be exceeded, the control procedure does not respond to the transmission success and procedure A terminates (Step 622). If the upper limit would not be exceeded, the control procedure adjusts the outer-loop adjustment upward by an up_step (Step 608) and also updates the accumulated aggressive adjustment if the selected MCS is aggressive (Step 614, 616). At this point, procedure A 602 also checks if the accumulated conservative adjustment is smaller than a threshold and, if so, adjusts it upward by an up_step.

If the selected MCS is conservative, procedure A 602 adjusts the outer-loop adjustment upward by an up_step only when the accumulated conservative adjustment is smaller than a threshold and the upwardly adjusted SINR would not have exceeded an upper limit (Step 618 and 620). When the outer-loop adjustment is adjusted upward, the accumulated conservative adjustment is also updated to account for the upward adjustment.

In some embodiments, the control procedure is implemented to increase the accumulated conservative adjustment by an up_step whenever the transmission is successful and the accumulated conservative adjustment is smaller than a threshold. For example, the threshold may be set to zero. In some embodiments, the control procedure is implemented to increase the accumulated conservative adjustment by an up_step when the transmission is successful, the accumulated conservative adjustment is smaller than a threshold, and the selected MCS is conservative or normal. In some other embodiments, the control procedure is implemented to increase the accumulated conservative adjustment by an up_step when the transmission is successful, the accumulated conservative adjustment is smaller than a threshold, and the selected MCS is conservative.

FIG. 7 illustrates an exemplary procedure B 702 invoked when the transmission of the transport block has failed. In procedure B 702, the generalized outer-loop control procedure determines whether the selected MCS is normal or conservative (Step 704). If the selected MCS is normal or conservative, the control procedure adjusts the outer-loop adjustment downwards by a down_step if the estimated SINR is larger than a predetermined lower_limit (Step 704, 706, 708). If the selected MCS is conservative, the accumulated conservative adjustment is also updated to reflect the adjustment made to the outer-loop adjustment (Step 714, 716). Also procedure B 702 at this point reduces the accumulated aggressive adjustment by the down_step if the accumulated aggressive adjustment is larger than a predetermined threshold (Step 710, 712). When the estimated SINR is smaller than or equal to the lower limit, procedure B terminates (Step 706, 722).

If the selected MCS is aggressive, procedure 702 adjusts the outer-loop adjustment downward only when the accumulated aggressive adjustment is greater than a predetermined threshold and the estimated SINR is larger than the lower limit (Step 718, 720). The accumulated aggressive adjustment is updated accordingly as well (Step 720).

In some embodiments, the control procedure reduces the accumulated aggressive adjustment by a down_step when the transmission has failed and the current accumulated aggressive adjustment is larger than a predetermined threshold. In some embodiments, the control procedure reduces the accumulated aggressive adjustment by a down_step when the transmission has failed, the current accumulated aggressive adjustment is larger than a predetermined threshold, and the selected MCS is aggressive or normal. In some other embodiments, the control procedure reduces the accumulated aggressive adjustment by a down_step when the transmission has failed, the current accumulated aggressive adjustment is larger than a predetermined threshold, and the selected MCS is aggressive.

In one embodiment, a simplified generalized outer-loop control procedure may be implemented. In the simplified generalized outer-loop control procedure, the outer-loop adjustment is set to zero when conservative or aggressive MCSs are used.

Figure 8:
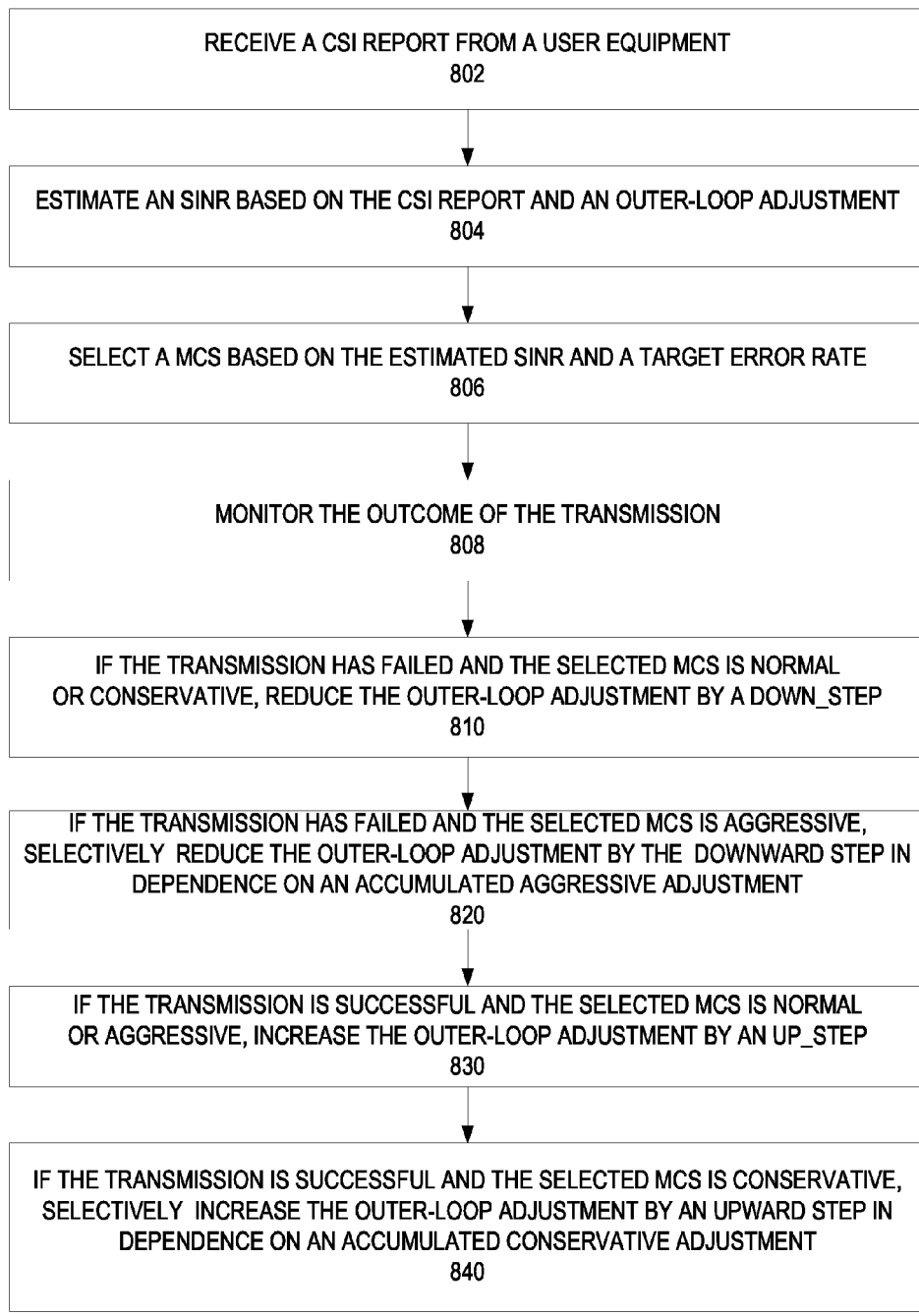
FIG. 8 is a flow chart illustrating an exemplary generalized outer-loop control procedure.

FIG. 8 summarizes the generalized outer-loop control procedure described above. In FIG. 8, the eNB 102 receives a CSI report from a UE (Step 802) and estimates an SINR based on the CSI report and an outer-loop adjustment (Step 804), the eNB 102 then selects a MCS for transmission of a data packet based on the corrected SINR and a target error rate (Step 806). The selected MCS may be normal, conservative or aggressive. The eNB 102 monitors the outcome of the transmission (Step 808) and performs one of the following four actions.

If the transmission has failed and the selected MCS is normal or conservative, the outer-loop adjustment is reduced by a down_step (Step 810).

If the transmission has failed and the selected MCS is aggressive, the eNB selectively reduces the outer-loop adjustment by a down_step in dependence on an accumulated aggressive adjustment (Step 820).

If the transmission is successful and the selected MCS is normal or aggressive, the outer-loop adjustment is increased by an up_step (Step 830).

If the transmission is successful and the selected MCS is conservative, the eNB 102 selectively increases the outer-loop adjustment by an up_step in dependence on the accumulated conservative adjustment (Step 840).

Figure 9:
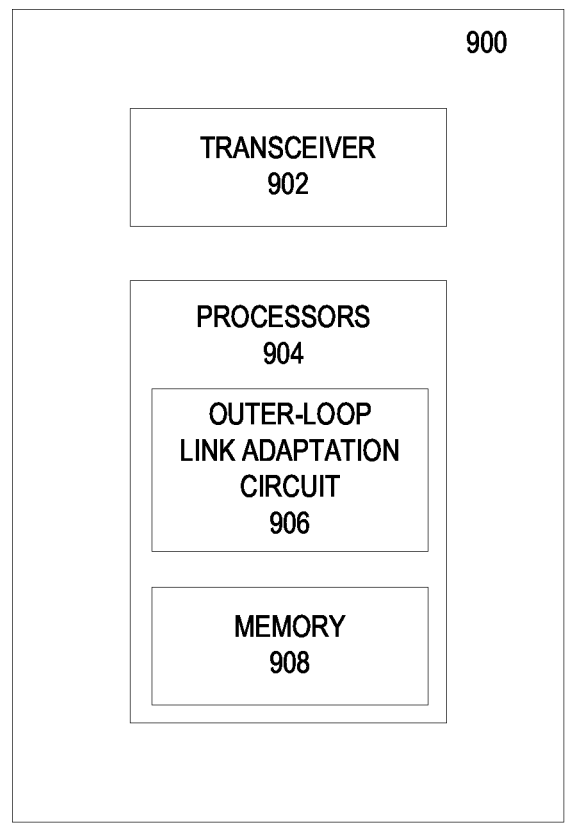
FIG. 9 is a block diagram of a wireless device configured to implement a generalized outer-loop control procedure.

FIG. 9 illustrates an exemplary network node 900, e.g., an eNB, configured to perform the generalized outer loop control procedure described above. The network node 900 comprises a transceiver 902 for transmitting and receiving data to and from UEs. The network node 900 also comprises one or more processors 904. The one or more processors 904 include an outer-loop link adaptation circuit 906 and a memory 908. The outer-loop link adaptation circuit 906 is configured to perform an outer loop control procedure, e.g., a generalized outer loop control procedure as described in FIG. 8. The memory 908 is configured to store necessary data needed by the outer loop link adaptation circuit 906.

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of adjusting an estimated signal to interference plus noise ratio (SINR) in an outer-loop link adaptation (LA) process, comprising:
   receiving a channel state information (CSI) report from a user equipment;
   estimating an SINR based on the CSI report and an outer-loop adjustment;
   selecting a modulation and coding scheme (MCS) for transmission of a data packet based on the estimated SINR and a target error rate, wherein the selected MCS may be normal, conservative or aggressive;
   monitoring an outcome of the transmission;
   if the transmission has failed and the selected MCS is normal or conservative, reducing the outer-loop adjustment by a downward step;
   if the transmission has failed and the selected MCS is aggressive, selectively reducing the outer-loop adjustment by the downward step in dependence on an accumulated aggressive adjustment;
   if the transmission is successful and the selected MCS is normal or aggressive, increasing the outer-loop adjustment by an upward step; and if the transmission is successful and the selected MCS is conservative, selectively increasing the outer-loop adjustment by the upward step in dependence on an accumulated conservative adjustment.

2. The method of claim 1, wherein the accumulated conservative adjustment is initialized at the beginning of the link adaptation process and wherein the accumulated conservative adjustment is reduced by the downward step when the transmission is failed and the selected MCS is conservative.

3. The method of claim 1, wherein the accumulated conservative adjustment is increased by the upward step when the transmission is successful and the accumulated conservative adjustment is smaller than a threshold.

4. The method of claim 1, wherein the accumulated conservative adjustment is increased by the upward step when the transmission is successful, the accumulated conservative adjustment is smaller than a threshold, and the selected MCS is conservative or normal.

5. The method of claim 1, wherein the accumulated conservative adjustment is increased by the upward step when the transmission is successful, the accumulated conservative adjustment is smaller than a threshold, and the selected MCS is conservative.

6. The method of claim 1, wherein selectively increasing outer-loop adjustment by an upward step in dependence on an accumulated conservative adjustment when the transmission is successful and the selected MCS is conservative comprises increasing the outer-loop adjustment by an upward step when the accumulated conservative adjustment is smaller than a threshold.

7. The method of claim 1, wherein the accumulated aggressive adjustment is initialized at the beginning of the LA process and wherein the accumulated aggressive adjustment is increased by the upward step when the transmission is successful and the selected MCS is aggressive.

8. The method of claim 1, wherein the accumulated aggressive adjustment is reduced by the downward step when the transmission has failed and the accumulated aggressive adjustment is larger than a threshold.

9. The method of claim 1, wherein the accumulated aggressive adjustment is reduced by the downward step when the transmission has failed, the accumulated aggressive adjustment is larger than a threshold, and the selected MCS is aggressive or normal.

10. The method of claim 1, wherein the accumulated aggressive adjustment is reduced by the downward step when the transmission has failed, the accumulated aggressive adjustment is larger than a threshold, and the selected MCS is aggressive.

11. The method of claim 1, wherein selectively reducing the outer-loop adjustment by the downward step in dependence on an accumulated aggressive adjustment when the transmission has failed and the selected MCS is aggressive comprises reducing the outer-loop adjustment by the downward step when the accumulated aggressive adjustment is larger than a threshold.

12. The method of claim 1, wherein both the upward step and the downward step are set to zero when the selected MCS is either conservative or aggressive and wherein both the upward step and the downward step are set to a non-zero value when the selected MCS is normal.

13. A wireless device, comprising:
a transceiver for transmitting and receiving data packets;
a processor configured to adjust an estimated signal to interference plus noise ratio (SINR) in an outer-loop link adaptation process, said processor configured to:
receive a channel state information (CSI) report from a user equipment;
estimate an SINR based on the CSI report and an outer-loop adjustment;
select a modulation and coding scheme (MCS) for transmission of a data packet based on the estimated SINR and a target error rate, wherein the selected MCS may be normal, conservative or aggressive;
monitor an outcome of the transmission;
if the transmission has failed and the selected MCS is normal or conservative, reduce the outer-loop adjustment by a downward step;
if the transmission is failed and the selected MCS is aggressive, selectively reduce the outer-loop adjustment by the downward step in dependence on an accumulated aggressive adjustment;
if the transmission is successful and the selected MCS is normal or aggressive, increase the outer-loop adjustment by an upward step; and
if the transmission is successful and the selected MCS is conservative, selectively increase the outer-loop adjustment by the upward step in dependence on an accumulated conservative adjustment.

14. The wireless device of claim 13, wherein the accumulated conservative adjustment is initialized at the beginning of the link adaptation process and wherein the accumulated conservative adjustment is reduced by the downward step when the transmission is failed and the selected MCS is conservative.

15. The wireless device of claim 13, wherein the accumulated conservative adjustment is increased by the upward step when the transmission is successful and the accumulated conservative adjustment is smaller than a threshold.

16. The wireless device of claim 13, wherein selectively increasing the outer-loop adjustment by an upward step in dependence on an accumulated conservative adjustment when the transmission is successful and the selected MCS is conservative comprises increasing the outer-loop adjustment by an upward step when the accumulated conservative adjustment is smaller than a threshold.

17. The wireless device of claim 13, wherein the accumulated aggressive adjustment is initialized at the beginning of the LA process and wherein the accumulated aggressive adjustment is increased by the upward step when the transmission is successful and the selected MCS is aggressive.

18. The wireless device of claim 13, wherein the accumulated aggressive adjustment is reduced by the downward step when the transmission has failed and the accumulated aggressive adjustment is larger than a threshold.

19. The wireless device of claim 13, wherein selectively reducing the outer-loop adjustment by the downward step in dependence on an accumulated aggressive adjustment when the transmission has failed and the selected MCS is aggressive comprises reducing the outer-loop adjustment by the downward step when the accumulated aggressive adjustment is larger than a threshold.

20. The wireless device of claim 13, wherein both the upward step and the downward step are set to zero when the selected MCS is either conservative or aggressive and wherein both the upward step and the downward step are set to a non-zero value when the selected MCS is normal.

* * * * *